United States Patent

Kuwabara et al.

[11] Patent Number: 5,833,723
[45] Date of Patent: Nov. 10, 1998

[54] HYDROGEN GENERATING APPARATUS

[75] Inventors: Yasuo Kuwabara, Kasugai; Hiroshige Ota, Anjyo; Akira Matsuoka, Chiryu; Takumi Hayashi, Toyota; Nobuhisa Watanabe, Nagoya, all of Japan

[73] Assignee: Aisin Seiki Kabushiki Kaisha, Kariya, Japan

[21] Appl. No.: 727,631
[22] PCT Filed: Feb. 26, 1996
[86] PCT No.: PCT/JP96/00434
  § 371 Date: Nov. 15, 1996
  § 102(e) Date: Nov. 15, 1996
[87] PCT Pub. No.: WO96/26892
  PCT Pub. Date: Sep. 6, 1996

[30]  Foreign Application Priority Data

Feb. 27, 1995 [JP] Japan .................................. 7-038792
Sep. 8, 1995 [JP] Japan .................................. 7-231833

[51] Int. Cl.⁶ ............................. B01J 7/00; B01J 23/00; C01B 3/02
[52] U.S. Cl. ........................... 48/61; 423/648.1; 502/300
[58] Field of Search ........................ 423/648.1; 502/300; 48/61

[56]  References Cited

U.S. PATENT DOCUMENTS 4,789,540 12/1988 Jenkins .................................. 423/648.1
4,946,667 8/1990 Beshty et al. ......................... 423/648.1
5,110,559 5/1992 Kondo et al. ............................ 422/109

FOREIGN PATENT DOCUMENTS

63-147802 6/1988 Japan .

Primary Examiner—Ardin H. Marschel
Assistant Examiner—Jezia Riley
Attorney, Agent, or Firm—Oblon, Spivak, McClelland, Maier & Neustadt, P.C.

[57]  ABSTRACT

In a hydrogen generating apparatus comprising a housing (10) in which a catalyst (11) is filled up into an inner space (10a), a supplying tube (12) opening to the inner space, a blowing tube (14) by which a reformed gas generated in the inner space with reacting is removed from the inner space, the methanol supplying means (20, 21) connected to the supplying tube and the oxygen supplying means (30, 31, 32) connected to the supplying tube, the heating means (13) placed in near an opening part of the supplying tube are provided and when starting, a time period for obtaining the sufficient amounts of hydrogen generated can be shorten.

10 Claims, 11 Drawing Sheets

HYDROGEN GENERATING APPARATUS

SPECIFICATION

1. Technical Field

This invention relates to a hydrogen generating apparatus.

2. Background Art

An apparatus using a steam reforming method and partially oxidative reforming method is well known as shown in the prior art.

Hydrogen is obtained by a reacting method with water in a reaction tube under heating as shown, in a steam reforming method;

$$CH_3OH + H_2O \rightarrow CO_2 + 3H_2$$

A merit of the steam reforming method is to obtain high hydrogen concentrations in the reforming gases, but as a shortcoming, the following problems are present:

(1) it is difficult to make the apparatus too small, because storage means for water and heating means are needed, making a structure for such means complex, (2) heating is needed for an endothermic reaction. Accordingly, it was a problem that a loading property of the apparatus (the apparatus becomes large), starting property (a long time period is needed to obtain the sufficient amounts of hydrogen after starting) and a response (when the amount of hydrogen is increased at a time, a long time is needed to obtain the amounts of hydrogen needed) are bad.

The partially oxidative reforming method is proposed by the problems mentioned above, the apparatus using the method is shown in Japanese Patent Laid-open Publication Sho 63-147802, in which hydrogen is produced by flowing a mixture of methanol and oxygen (air) into a housing equipped with a catalyst and said reaction is as follows:

$$CH_3OH + \tfrac{1}{2}O_2 \rightarrow CO_2 + 2H_2.$$

The merits of the partially oxidative reforming method mentioned above are:

(1) it is possible to make the apparatus small, because the structure is simple, (2) the heating source is unnecessary to produce the reaction due to an exothermic reaction.

Accordingly, a loading property of the apparatus (that is, small sized), starting property and response become good. In the hydrogen generating apparatus using the partially oxidative reforming method shown in the Japanese Patent Laid-open Publication Sho 63-147802 mentioned above, it is possible to make a time period short from starting for generating hydrogen compared to the apparatus of the steam reforming method. However, in a normal temperature condition after starting, immediately the sufficient amount of hydrogen generated can not be obtained by that the reaction of methanol with oxygen does not fully occur because of a low capacity of catalytic activity. Then, it is necessary to achieve the operating temperature (300° C.–400° C.) of the catalytic activity for obtaining the sufficient amounts of hydrogen generated.

DISCLOSURE OF INVENTION

An object of this invention is to provide a hydrogen generating apparatus capable of lowering the time period to obtain sufficient amounts of hydrogens for starting the apparatus. To achieve the above mentioned object, the technical means of this invention shown in claim 1 comprises a housing in which the catalyst is filled within the inner space, a supplying type opening to an inner space, a blowing tube by which the reformed gases generated from reaction in the inner space are removed from the inner space, the supplying means of methanol connected to the supplying tube, the supplying means of oxygen connected to the supplying tube, and the heating means provided near an opening portion of the supplying tube in the hydrogen generating apparatus.

The technical means of this invention shown in claim 2 comprises the housing in which the catalyst is filled within the inner space, the supplying tube opening to the inner space, the blowing tube by which the reformed gases generated from reaction in the inner space are removed from the inner space, the methanol and oxygen supplying means connected to the supplying tube in the hydrogen generating apparatus. Also the reformed gas storage means, by which the supplying tube and the blowing tube are connected on a connecting tube and the exchanging means for cutting off and passing through the connecting tube providing on the connecting tube of the supplying tube side in the reformed gas storage means and the blowing tube side are provided on the hydrogen generating apparatus.

To burn oxygen and hydrogen present in the reformed gas effectively near the opening part of the supplying tube, the technical means shown in the invention of claim 3 are to mix a combustion catalyst with the catalyst present near the opening part of the supplying tube.

The technical means shown in the invention of claim 4 is to provide the housing filling the catalyst in the inner space, the supplying tube opening to the inner space, the blowing tube by which the reformed gases generated in the inner space are removed from the inner space, the methanol supplying means connected to the supplying tube and the oxygen supplying means connected to the supplying tube in the hydrogen generating apparatus and a covering part covering the housing and the heating means by which the housing and a space between the housing and the covering part are heated.

The technical means shown in the invention of claim 5 are to provide the housing filling the catalyst in the inner space, the supplying tube opening to the inner space, the blowing tube by which the reformed gases generated in the inner space are removed from the inner space, the methanol supplying means connected to the supplying tube, and the oxygen supplying means connected to the supplying tube in the hydrogen generating apparatus, the supplying tube has the opening part having at least a large area and a small area and the selective means for the opening part by which methanol and oxygen supplying from the methanol and oxygen supplied means are blown.

The technical means shown in the invention of claim 6 is to provide the housing filling the catalyst in the inner pace, the supplying tube opening to the inner space, the blowing tube by which the reformed gases generated in the inner space are removed from the inner space, the methanol supplying means connected with the supplying tube and the oxygen supplying means connected with the supplying tube in the hydrogen generating apparatus, in which the plural housing are constructed and the selective means of the housing are provided to select the housing in which methanol and oxygen are supplied. To improve the starting property and the amounts of hydrogen generated per unit weight and unit volume, the technical means shown in the inventions of claims 7 and 8 are to provide plural opening parts, a stirring room provided between the opening part, the methanol supplying means and the oxygen supplying means.

In the invention shown in claim 1, methanol and oxygen supplied to the supplying tube from the methanol and oxygen supplying means are blown into the catalyst from the opening part of the supplying tube. The mixed fluids of methanol and oxygen are reacted by contacting with the catalyst as follows:

$$CH_3OH + \tfrac{1}{2}O_2 \rightarrow CO_2 + 2H_2.$$

The reformed gases generated from this reaction (the mixed gases of $CO_2$ and $H_2$) are blown by the blowing tube sequentially.

Further, when the catalyst temperature is not within the operating temperature so as to the starting time, the catalyst temperature near the opening part of the supplying tube is improved by the heating means provided near the opening part of the supplying tube; after that the mixed fluids of methanol and oxygen are supplied and the operating temperature is easily reached by the reaction heat and the heating of the heating means.

In the invention shown in claim 2, the mixed fluids of methanol and oxygen are changed to the mixed gases of $CO_2$ and $H_2$, then the mixed gases are blown sequentially by the blowing tube.

Further, when the hydrogen generating apparatus is operating, the portions of the reformed gases present in the blowing tube are stored in the reformed gas storage means by cutting of the connecting tube present in the supplying tube side in which the connecting tube present in the blowing tube side of the reformed gas storage means is passed through by the exchanging means. When the operation is stopped, the reformed gases present in the reformed gas storage means are sealed up by cutting of the connecting tube present in the blowing tube side of the reformed gas storage means. When the catalyst temperature does not reach the operating temperature so as to the starting time and the reaction of methanol and oxygen does not occur sufficiently, the connecting tube present in the supplying tube side of the reformed gas storage means is passed through by the exchanging means, the operation of the methanol supplying means is stopped and the mixed fluids of the reformed gases and the air are supplied into the housing. Then hydrogen present in the reformed gases ( easier reactive than methanol) and the air are reacted as follows. The catalyst is burned and the temperature near the opening part of the supplying tube is improved shortly.

After that, the connecting tube of the supplying tube side in the reformed gas storage means is cut off by the exchanging means and the sufficient amounts of hydrogen are obtained by reacting methanol with oxygen actively.

In the invention of claim 3, hydrogen in the reformed gases and oxygen can be burned near the opening part in the supplying tube effectively by mixing the combustion catalyst (preferably, Pt, Au, Pd, Rh and the likes) with the catalyst being placed near the opening part of the supplying tube. Also in the invention of claim 4, the mixed gases containing $CO_2$ and $H_2$ produced from the mixed fluids containing methanol and oxygen are blown sequentially by the blowing tube with the similar action in the invention of claim 1.

Further, when the catalyst temperature does not reach the operating temperature, the space between the covering portion and the housing is warmed by the heating means, first the catalyst temperature is improved, after that the catalyst temperature is heated to the operating temperature shortly by the reaction heat produced by the reaction of the mixed fluids of oxygen and methanol and the heat of the heating means.

Also, in the invention of claim 5, the mixed gases containing $CO_2$ and $H_2$ produced by the mixed fluids containing methanol and oxygen with the similar action in the invention of claim 1 are blown from the blowing tube.

Further, the supplying tube has at least the opening parts having large and small areas and controls whether the opening parts are used to blow the mixed fluids containing methanol and oxygen with the selective means in the opening part. When starting, that is, the catalyst temperature does not reach the operating temperature, the mixed fluids are blown from the opening part having a small area to speed up the mixed fluid velocity and the temperature rising rate, and when the operating temperature is achieved, the mixed fluids are blown from the opening part having a large area because it is unnecessary to speed up the temperature rising rate.

In the invention of claim 6, the mixed gases containing $CO_2$ and $H_2$ produced by the mixed fluids containing methanol and oxygen are blown sequentially from the blowing tube with the similar action in the invention of claim 1. Further, the housings are constructed with the plural, then the heat capacity of one housing is reduced because the one housing size can be made small. Accordingly, even when starting, that is, the catalyst temperature does not reach the operating temperature, if the mixed fluids are supplied, the catalyst temperature is immediately raised by the reaction heat and the operating temperature is reached shortly. Also by selecting the housing with the housing selection means in which the mixed fluids are supplied, the amount of hydrogen generated is improved rapidly by supplying the mixed fluids to the plural housings.

In the invention of claim 7, the mixed fluids containing methanol and oxygen enter the inner space from the plural opening parts.

In the invention of claim 8, the mixed fluids containing methanol and oxygen are stirred in the stirring room and enter the inner space.

BEST EMBODIMENTS

Examples related to this invention are explained based on the drawings.

EXAMPLE 1

Figure 1:
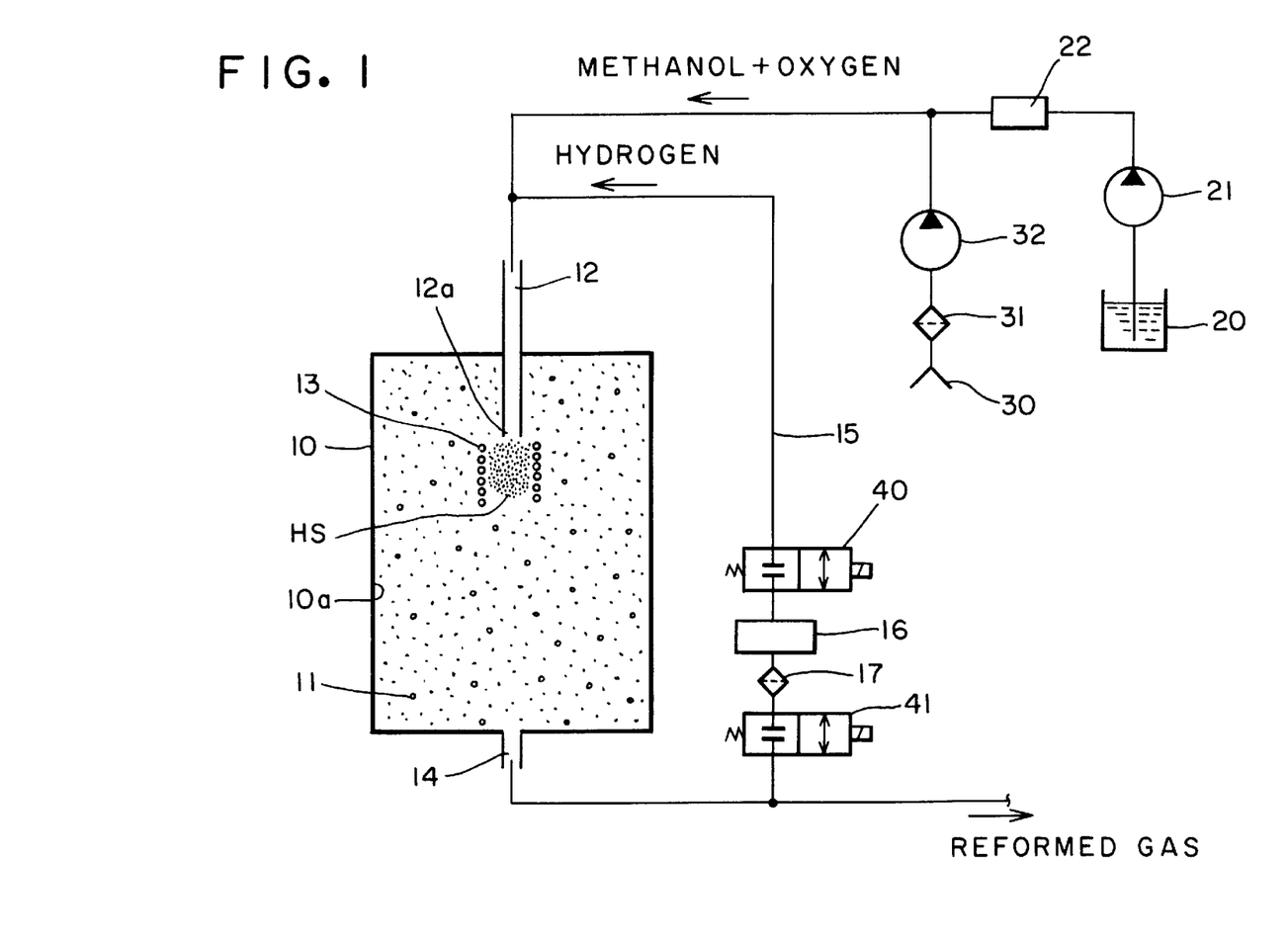
FIG. 1 shows the constitutional view of the hydrogen generating apparatus in Example 1 of this invention.

FIG. 1 is a model view relating to the hydrogen generating apparatus in Example 1 of this invention. The catalyst 11 is filled in the inner space 10a of the housing 10 and Cu catalyst, Ni catalyst and a novel metal catalyst are used as the catalyst 11.

In FIG. 1, the supplying tube 12 having an opening part is inserted into the inner space 10a of the housing and an electrical heater 13 is provided near the opening part 12a in the supplying tube 12 as the heating means.

The supplying tube 12 is connected to the methanol supplying means and the oxygen supplying means mentioned later. The methanol supplying means comprise a methanol tank 20 in which liquid methanol is stored, a methanol pump by which methanol stored in the methanol tank 20 is supplied sequentially to the supplying tube 12, and an evaporator 22 for methanol evaporation. The oxygen supplying means comprise an introducing part 30 of oxygen (air), a filter 31 by which the dust present in oxygen introduced is removed, and an air pump 32 for supplying oxygen to the supplying tube 12 sequentially.

On the other hand, the blowing tube 14 is provided to a lower portion of the housing 10, by which the reformed gases generated with the reaction are flowed out and the reformed gases streaming the blowing tube 14 are used to an electric power source being supplied to a fuel cell for instance.

The supplying tube 12 is connected to the blowing tube 14 by the connecting tube 15.

The solenoid valves 40, 41 which are the exchanging means, a hydrogen tank 16 (the reformed gas storage means) placed between the solenoid valves 40, 41 and a hydrogen permeable membrane placed between the hydrogen tank 16 and the solenoid valve 41 are placed on the connecting tube 15.

The operating controls of the electrical heater 13, the solenoid valves 40, 41, the methanol pump 21, and the air pump 32 are done by the controlling apparatus not shown in the Figure.

The action shown in Example 1 mentioned above is explained as follows:

When starting the hydrogen generating apparatus, the catalyst activity is low and sufficient amounts of hydrogen are not produced because the catalyst temperature is the normal temperature. Then the temperature of the catalyst present near the opening part 12a in the supplying tube 12 (called as hot spot HS as follows) is improved by sending the electrical current to the electrical heater. At the same time, the solenoid valve 40 is changed to the position to be passed through the connecting tube 15 and further the air pump is operated.

By these, the catalyst present in hot spot Hs is shortly heated to the operating temperature with Joule's heat produced in the electrical heater 13 and the reaction heat generated with the catalyst combustion of hydrogen and oxygen.

Hydrogen and oxygen easily burn with the catalyst, when Pt, Pd, Au and Rh are added to the hot spot Hs, as the combustion catalyst.

Also, when starting, in a case that the catalyst temperature is in the middle temperature between the normal temperature and the temperature usually being used, only the electrical heater can be operated. If the catalyst is heated to near the operating temperature, the electrical current to the electrical heater is cut, the methanol pump 21 is operated, the solenoid valve 40 is changed to cut of the connecting tube 15 and the solenoid valve 41 is changed to pass through the connecting tube 15.

Then the mixed fluids containing methanol and oxygen are supplied from the supplying tube 12, are reacted and the reformed gases containing $H_2$ and $CO_2$ flow from the blowing tube 14.

A portion of the reformed gases flowed flows into the connecting tube 15 and only hydrogen is stored into the hydrogen tank 16 by passing through the hydrogen permeable membrane 17.

In this invention, when starting, that is, the catalyst temperature does not reach the operating temperature, the catalyst temperature can be shortly achieved to the operating temperature with Joule's heat produced in the electrical heater 13 and the reaction heat generated with the catalyst combustion of hydrogen and oxygen and the sufficient amounts of hydrogen can be generated at the short time period.

EXAMPLE 2

Figure 2:
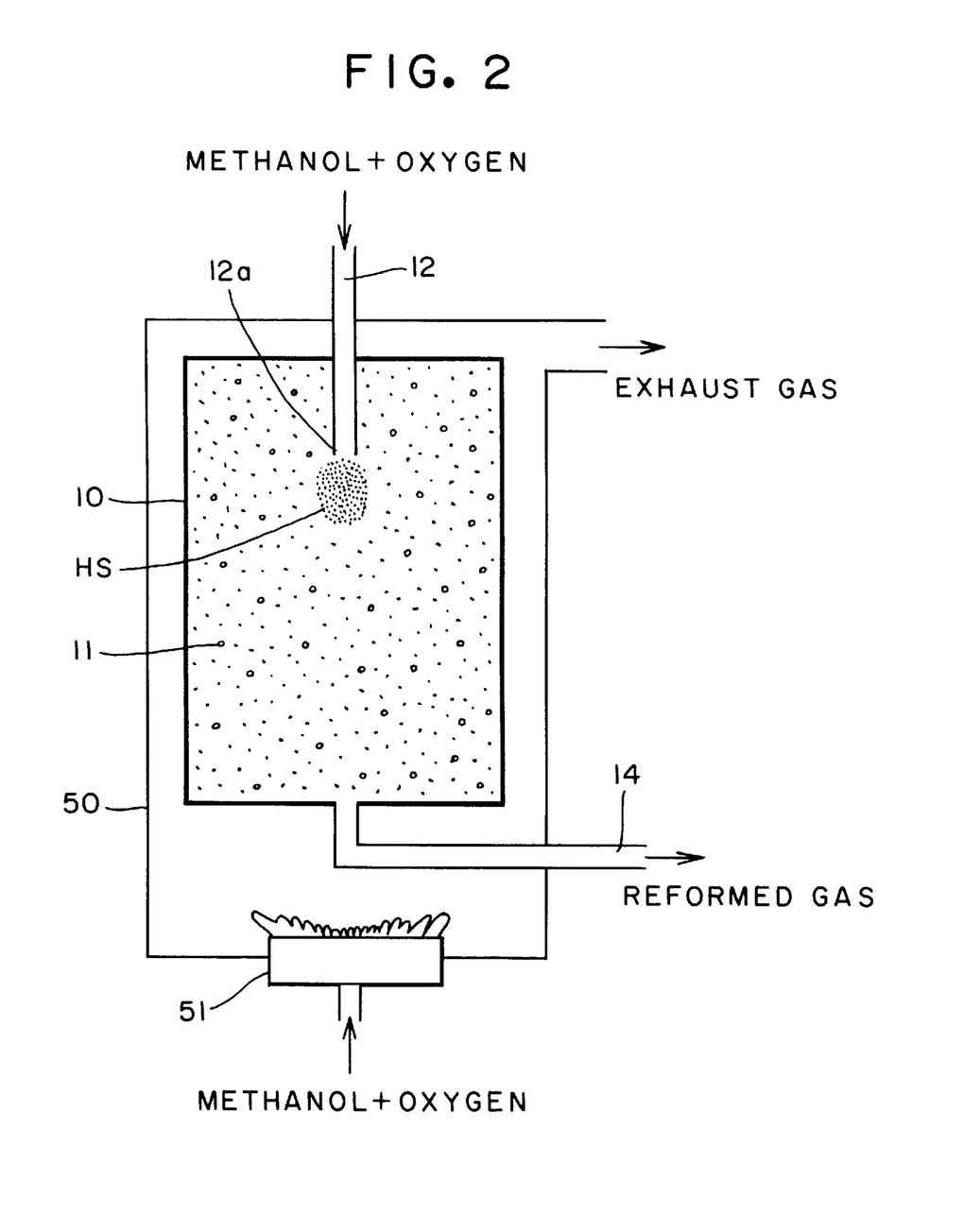
FIG. 2 shows the constitutional view of the circumference of the housing of the hydrogen generating apparatus in Example 2 of this invention.

FIG. 2 shows the constitutional view of the circumstance of the housing 10 in Example 2 of this invention and only the different points from Example 1 are illustrated. In the same figure, the housing 10 is wholly covered with a enclosure 50 and a burner (the heating means) 51 by which methanol and oxygen burn is placed at the base of the enclosure 50. When starting, that is, the temperature of the catalyst 11 does not reach the operating temperature, the space between the housing 10 and the enclosure 50 is heated by firing to the burner 51. By this, the catalyst 11 is warmed with the similar action in the electrical heater 13 in Example 1 and the sufficient amounts of hydrogen can be shortly generated.

EXAMPLE 3

Figure 3:
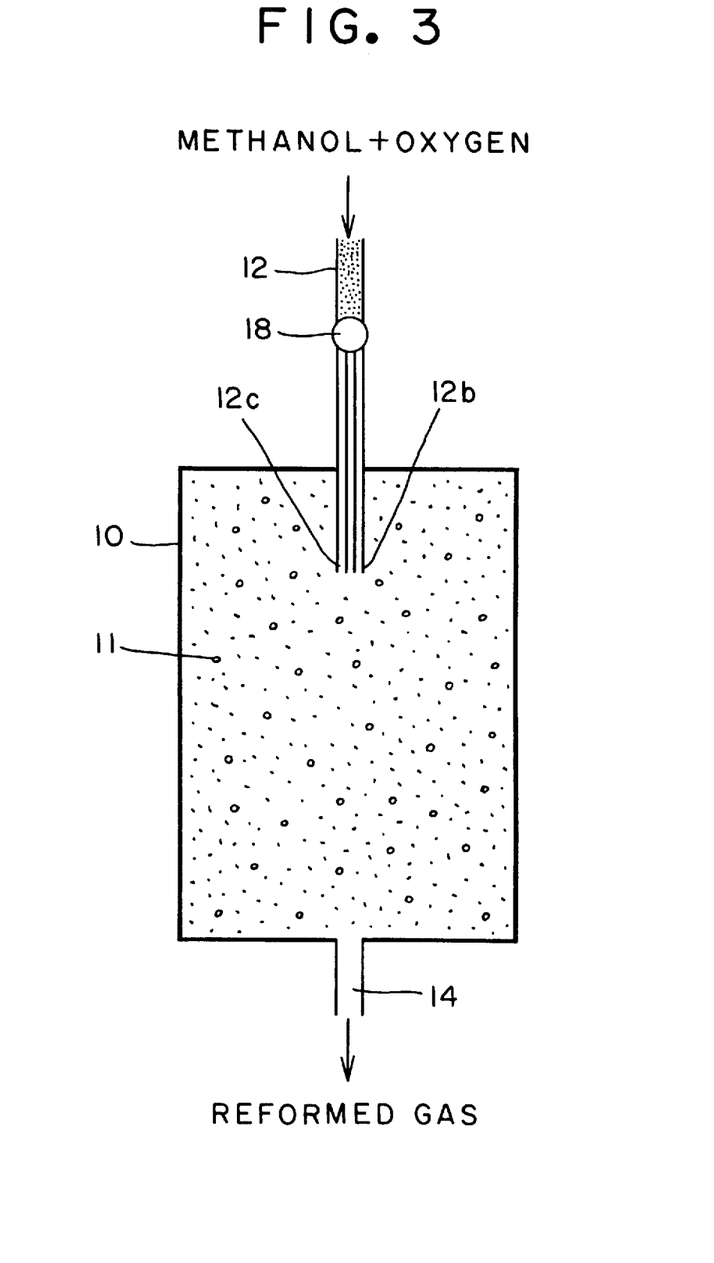
FIG. 3 shows the constitutional view of the circumference of the housing of the hydrogen generating apparatus in Example 3 of this invention (not operating).
Figure 4:
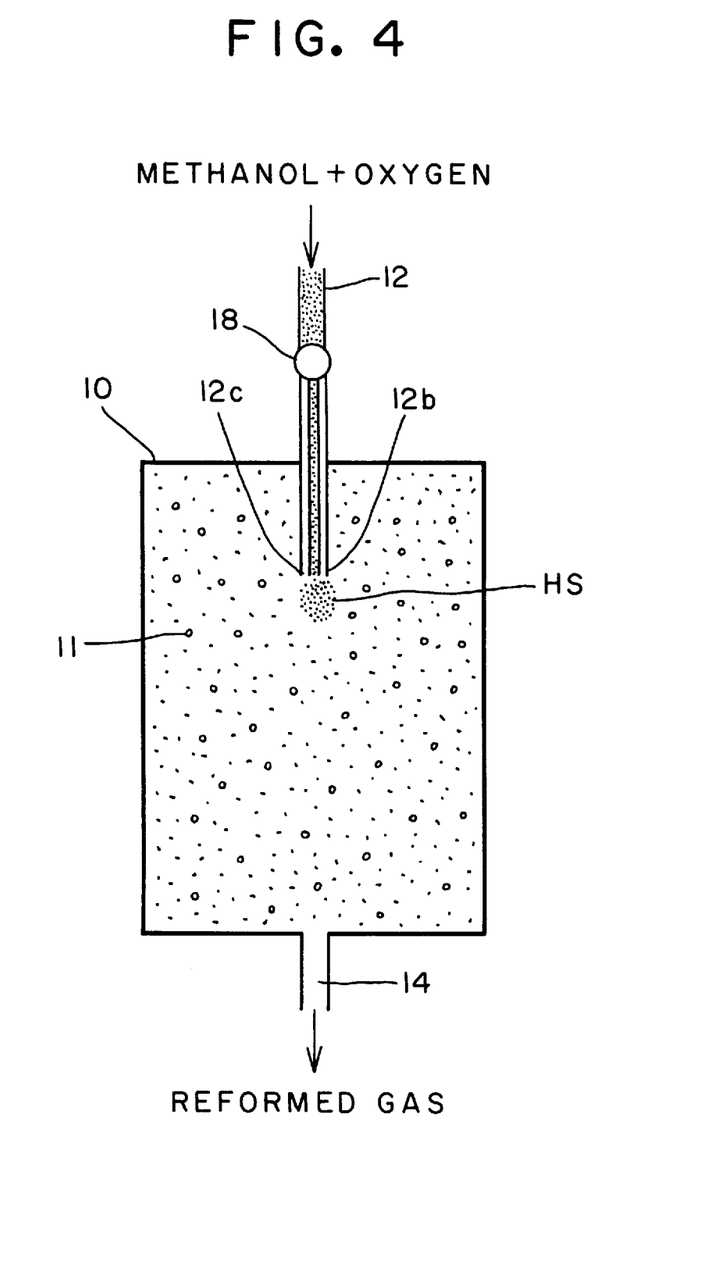
FIG. 4 shows the constitutional view of the circumference of the housing of the hydrogen generating apparatus in Example 3 of this invention (the catalyst temperature does not reach the operating temperature).
Figure 5:
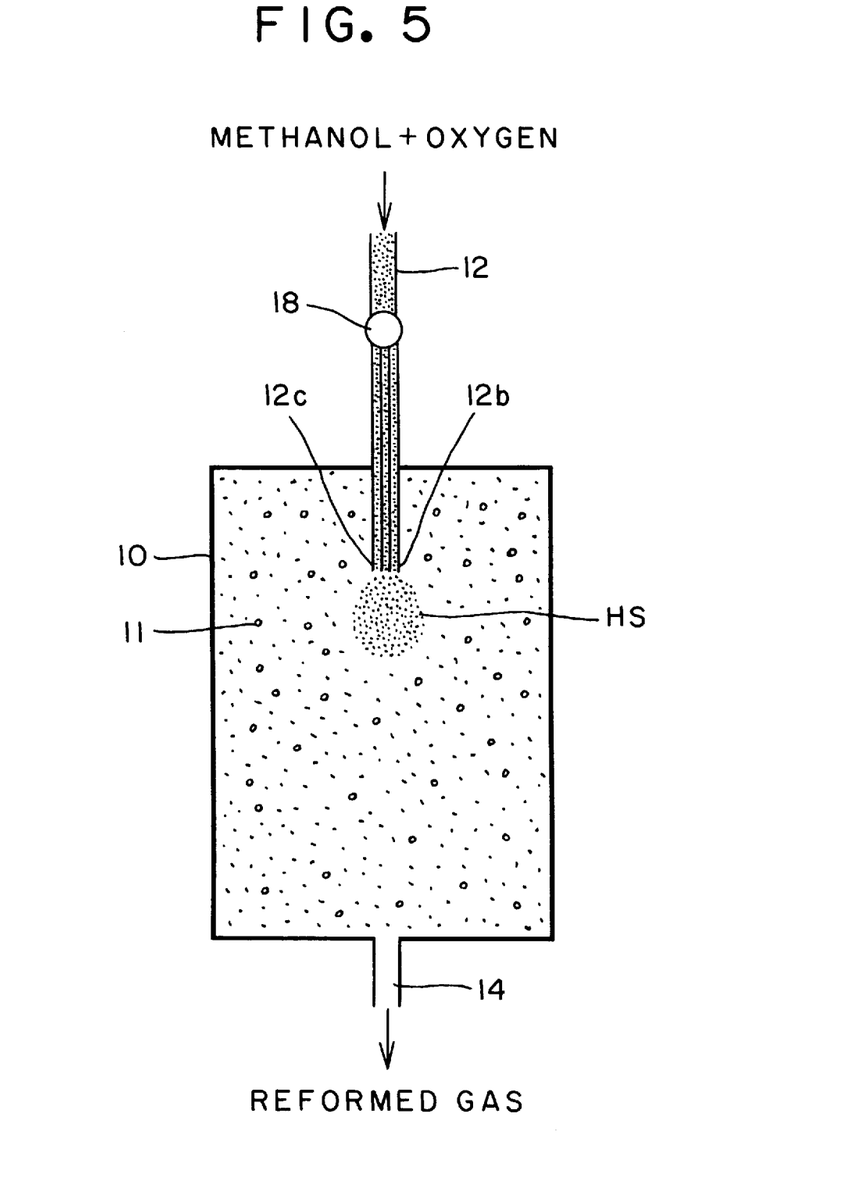
FIG. 5 shows the constitutional view of the circumference of the housing of the hydrogen generating apparatus in Example 3 of this invention (operating state).

FIGS. 3 to 5 show the constitutional views of the circumstance of the housing 10 in Example 3 of this invention and only the different points from Example 1 are illustrated.

In the supplying tube 12 of Example 3, the opening part is made from the double tube construction having the large opening part 12b and small opening part 12c, and the mixed fluids containing methanol and oxygen are blown from either the large opening part 12b or the small opening part 12c by changing the exchanging valve 18 constituting the selecting means of the opening parts.

In Example 3, when starting, the temperature of the catalyst 11 does not reach the operating temperature, it is needed to speed up the temperature rising rate with speeding up the mixed fluid velocity, then the mixed fluids are blown from the opening part having a small area 12c with controlling the exchanging valve 18 in the controlling apparatus (FIG. 4). When the catalyst temperature reaches the operating temperature, it is not needed to speed up the temperature rising velocity and the mixed fluids are blown from the opening part having a large area 12b in the supplying tube 12 (FIG. 5). By this, the catalyst 11 is shortly heated to the operating temperature and the sufficient amounts of hydrogen are shortly generated.

EXAMPLE 4

Figure 6:
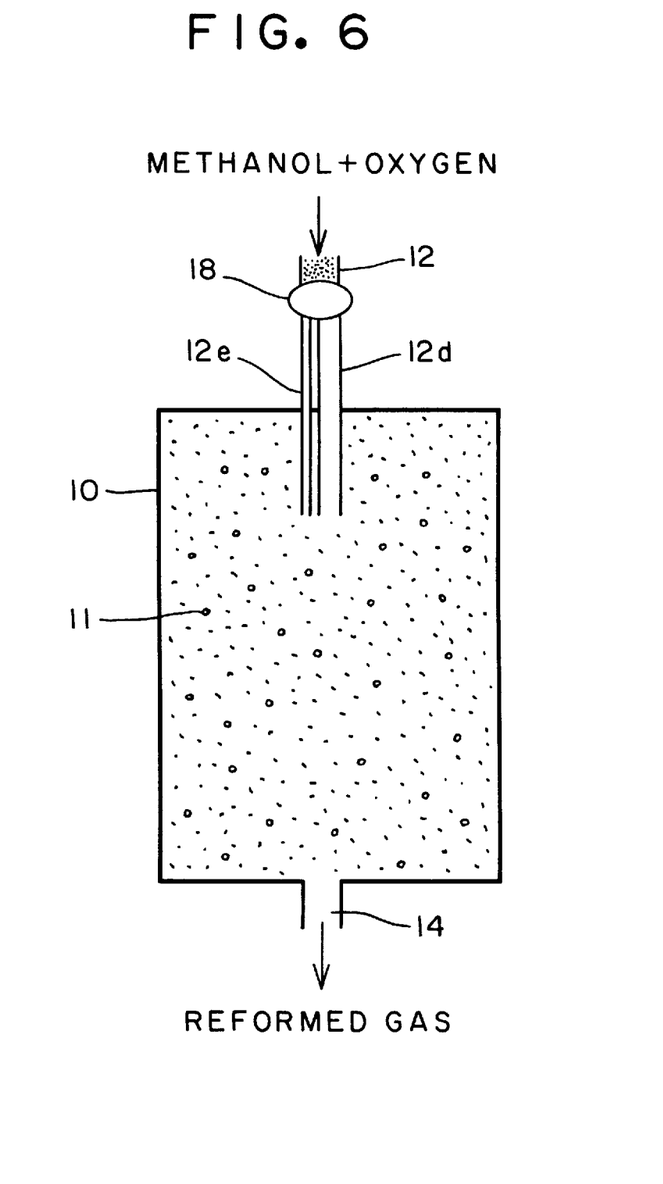
FIG. 6 shows the constitutional view of the circumference of the housing of the hydrogen generating apparatus in Example 4 of this invention (not operating).
Figure 7:
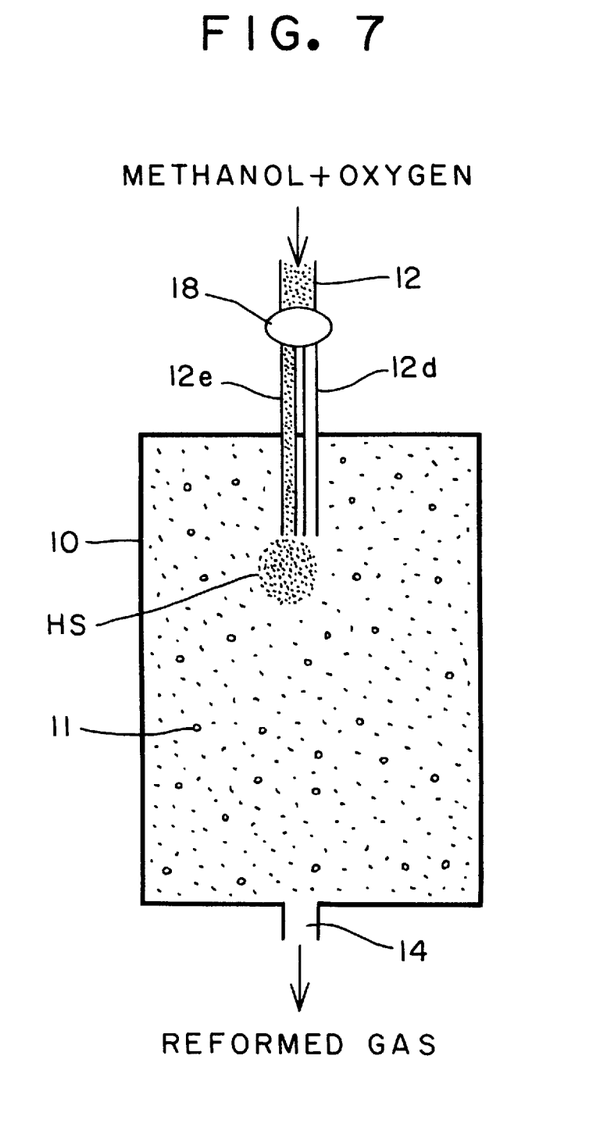
FIG. 7 shows the constitutional view of the circumference of the housing of the hydrogen generating apparatus in Example 4 of this invention (the catalyst temperature does not reach the operating temperature).
Figure 8:
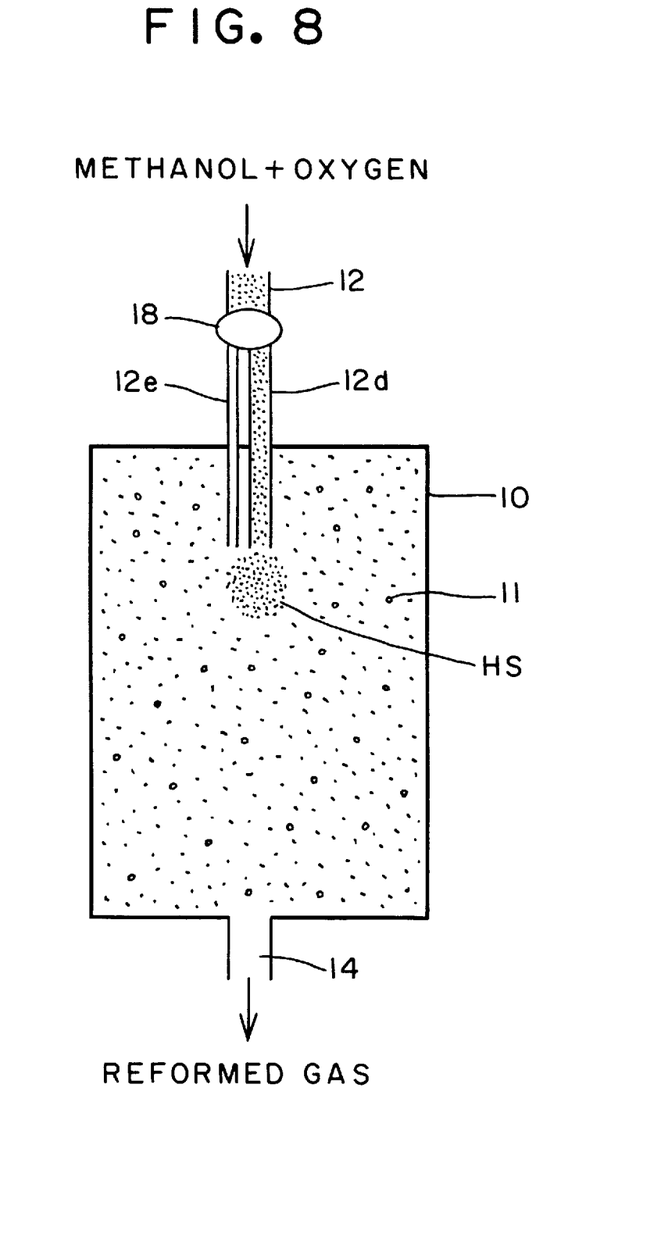
FIG. 8 shows the constitutional view of the circumference of the housing of the hydrogen generating apparatus in Example 4 of this invention (operating state).

FIGS. 6 to 8 show the constitutional view of the circumstance of the housing 10 in Example 4 of this invention and the different points from Example 3 mentioned above are illustrated in the figures.

The opening parts having large 12d and small 12e are made in the supplying tube 12 in Example 4 and the mixed fluids containing methanol and oxygen are blown from either the opening part having large 12d or small 12e by changing the exchanging valve 18 constructing the selection means of the opening parts. For instance, the exchanging valve 18 in Examples 3 and 4 is the solenoid valve.

In Example 4, when starting, the temperature of the catalyst does not reach the operating temperature, it is needed to speed up the temperature rising velocity with speeding up the mixed fluid velocity and the mixed fluids are blown from the opening part having small 12c with controlling the exchanging valve 18 in the controlling apparatus (FIG. 7). When the catalyst reaches the operating temperature, it is not needed to speed up the temperature rising velocity and the mixed fluids are blown from the opening part having large 12b while controlling the exchanging valve in the controlling means (FIG. 8). By these, the catalyst 11 can be heated shortly to the operating temperature and the sufficient amounts of hydrogen are generated shortly.

EXAMPLE 5

Figure 9:
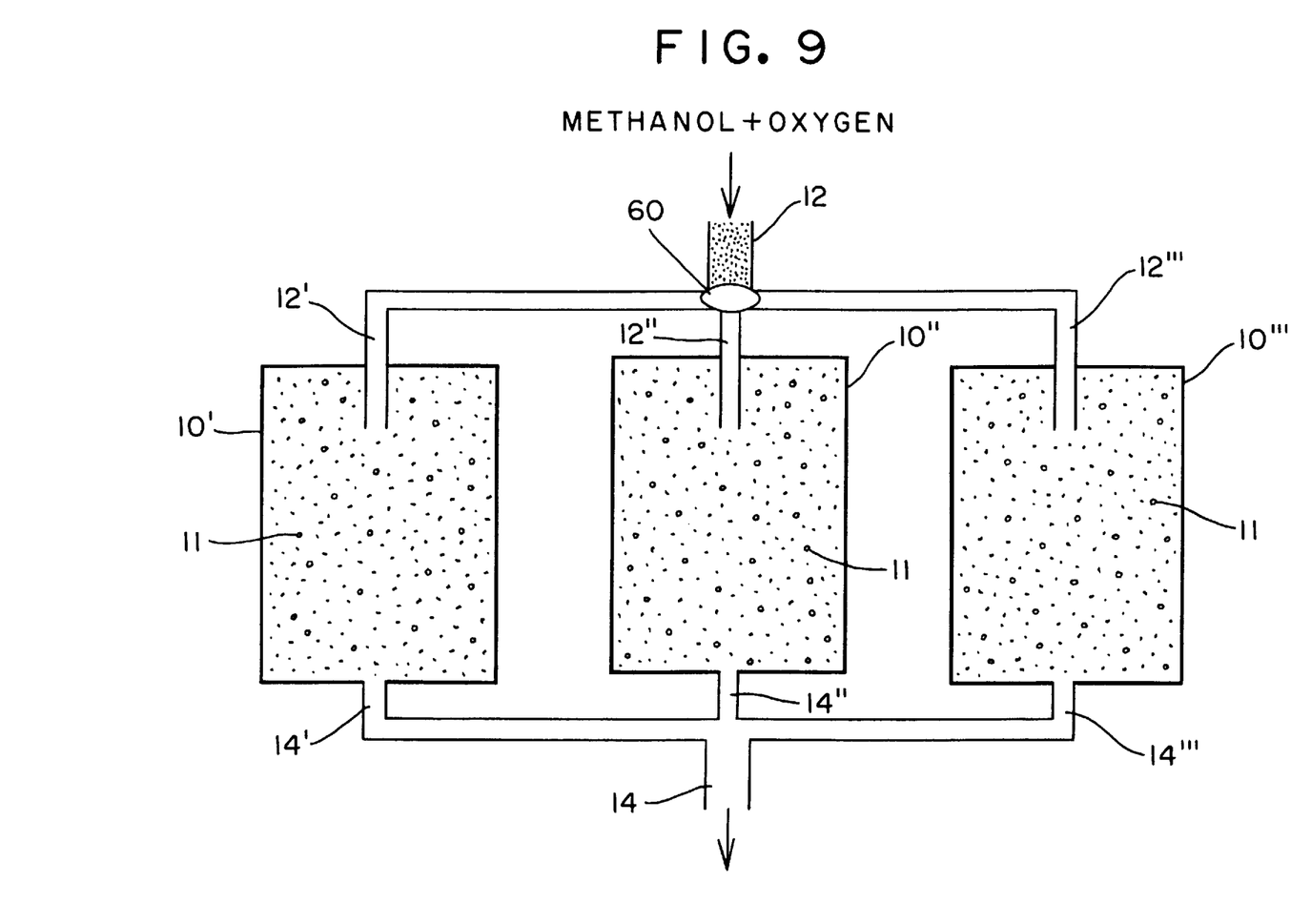
FIG. 9 shows the constitutional view of the circumference of the housing of the hydrogen generating apparatus in Example 5 of this invention.

FIG. 9 shows the constitutional view of the circumstance of the housing 10 in Example 5 of this invention and the different points from Example 1 are illustrated in such the figure. The housings 10 are made from the plural (three in Example 5) 10', 10" and 10'" and the supplying tubes 12', 12" and 12'" are inserted into each housings 10', 10" and 10'". The mixed fluids containing methanol and oxygen are supplied to any of the housing by selecting the housing with the selection valve 60 in the housing selection means, the blowing tubes 14', 14" and 14'" are placed in the housings 10', 10" and 10'", and further said blowing tubes are joined to the blowing tube 14.

In Example 5, since it is possible to make each housing size to small by constructing the housings to plural for producing the same amounts of hydrogen generated, then the heat capacity of each housing is reduced. Accordingly, even when starting, the temperature of the catalyst 11 does not reach the operating temperature, if the mixed fluids are supplied, the catalyst temperature rapidly rise with the reaction heat and reaches shortly to the operating temperature. Also if the mixed fluids are supplied to the plural housings by selecting the housing, in which the mixed fluids are supplied, with the selection valve 60, the amounts of hydrogen generated are rapidly improved.

EXAMPLE 6

Figure 10:
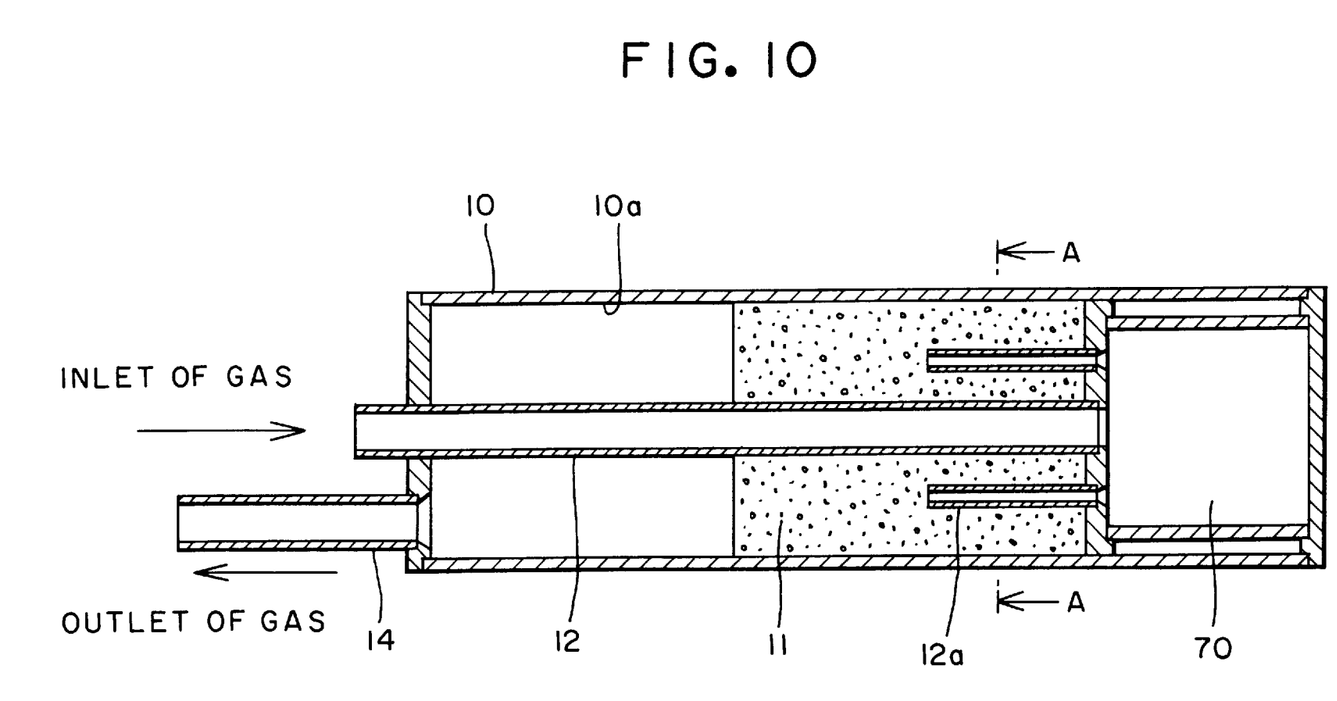
FIG. 10 shows the sectional view of the hydrogen generating apparatus in Example 6 of this invention.
Figure 11:
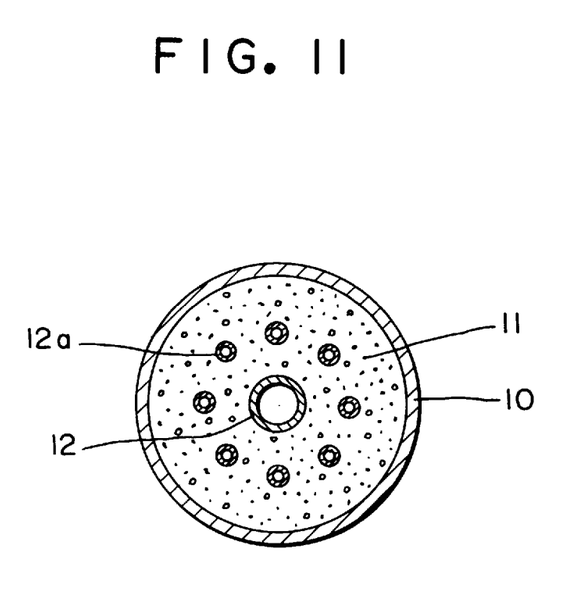
FIG. 11 shows the sectional view shown in A—A arrow.

FIG. 10 shows the sectional view of the hydrogen generating apparatus in Example 6 and FIG. 11 shows the sectional view of the sectional part A—A arrow in FIG. 10.

In FIG. 10, the catalyst 11 is filled in the inner space 10a of the cylindal housing 10. The supplying tube 12 is passed through in the housing 10, connected to the center of the stirring chamber 70 and the plural opening parts 12a are placed in the surrounding (8 opening parts in Example 6).

In Example 6, since the mixed fluids containing methanol and oxygen enter into the inner space 10a from the plural opening parts 12a, the catalyst can be effectively used, the amounts of hydrogen generated per unit weight unit volume are improved and it is possible to improve the capacity and to make the apparatus small. Further, the mixed fluids containing methanol and oxygen are stirred in the stirring chamber 70 before entering the inner space 10a from the opening part 12a and entering into the inner space 10a, then when the mixed fluids are contacted with the catalyst, the reaction easily occur and the running property and the efficiency are improved.

The Possibility of Utility on the Industry

In claim 1 of this invention, when starting, the catalyst temperature does not reach the operating temperature, the catalyst near the opening part of the supplying tube is heated to the operating temperature rapidly with the heat of the reaction and the heating means and the sufficient amounts of hydrogen generated can be obtained. In claim 2 of this invention, when starting, the catalyst temperature does not reach the operating temperature, the reformed gases stored in the reformed gas storage means are supplied, hydrogen (easier reacted than methanol) present in the reformed gases is reacted with oxygen and the temperature near the opening part of the supplying tube is improved rapidly by making the catalyst combustion do. After that, supplying of the reformed gases is stopped, the action of the methanol supplying means in started, and the sufficient amounts of hydrogen generated are obtained with reacting methanol and oxygen actively. For these, when compared to the method in which methanol and oxygen are reacted from the time that the catalyst is not warmed sufficiently, it is possible to obtain the sufficient amounts of hydrogen generated at a short time period.

In claim 3 of this invention, the combustion catalyst (preferably, Pt, Au, Pd, Rh and the likes) is mixed to the catalyst present near the opening part of the supplying tube and hydrogen and oxygen present in the reformed gases can be burnt effectively near the opening part of the supplying tube.

In claim 4 of this invention, when starting, the catalyst temperature does not reach the operating temperature, the space between the enclosure and the housing is heated with the heating means, first the catalyst temperature is improved, after that the mixed fluids containing methanol and oxygen are supplied, the operating temperature is shortly achieved by the reaction heat and the heat of the heating means and sufficient amounts of hydrogen generated can be obtained rapidly.

In claim 5 of this invention, when starting, that is, the catalyst temperature is not achieved to the operating temperature, the mixed fluids are blown from the opening parts having the small area and the temperature raising rate becomes speedy by making the mixed fluids rate quick. When the catalyst temperature reaches the operating temperature, the mixed fluids are blown from the opening parts having the large area, because it is not needed to make the temperature raising rate quick. For this operation, the catalyst can be shortly heated to the operation temperature and the sufficient amounts of hydrogen generated can be obtained rapidly.

In claim 6 of this invention, the plural housings are constructed, the size of the each housing can be made to small to generate the same amount of hydrogen and the heat capacity for each housing is decreased. For this, when starting, even the catalyst temperature does not reach the operating temperature, if the mixed fluids are supplied, the catalyst temperature is quickly raised with the reaction heat, the mixed fluids are heated quickly to the operating temperature, and sufficient amounts of hydrogen generated can be shortly obtained as a result. Also if the mixed fluids are supplied to the plural housings by which the mixed fluids are supplied by selecting the housing selection means, the amounts of hydrogen generated can be improved rapidly.

In claim 7 of this invention the catalyst is used effectively, because the mixed fluids containing methanol and oxygen enter to the inner space and the catalyst can be used effectively. As a result, the amounts of hydrogen generated per unit volume and unit weight can be improved and the improvements of capacity and starting property and the small sized apparatus can be obtained.

In claim 8 of this invention, the mixed fluids containing methanol and oxygen enter into the inner space from the opening part after stirring in the stirring chamber, then when the mixed fluids are contacted with the catalyst, the reaction occurs easily and the efficiency is improved.

The hydrogen generating apparatus of this invention is used in the fields such as a fuel cell, a hydrogen engine, a gas turbine, a metallurgy using hydrogen and a semiconductor manufacturing. Also methanol is used as the starting material because of an economical availability, but it is not restricted to use the other alkyl alcohols.

We claim:

1. A hydrogen generating apparatus comprising:

a housing in which a catalyst is filled up in an inner space;

a supplying tube having an opening part opening to said inner space, a blowing tube by which a reformed gas generated in said inner space is removed from said inner space;

a methanol supplying means connected to said supplying tube;

an oxygen supplying means connected to said supplying tube, and a heating means comprising a heater provided near said opening part of said supplying tube.

2. A hydrogen generating apparatus comprising:

a housing in which a catalyst is filled up in an inner space;

a supplying tube opening to said inner space;

a blowing tube by which a reformed gas generated in said inner space is removed from said inner space;

a methanol supplying means connected to said supplying tube;

an oxygen supplying means connected to said supplying tube, a gas storage means for said reformed gas provided on a connecting tube connecting said supplying tube and said blowing tube, a changing means for changing the condition of said connecting tube to be closed or opened provided on said connecting tube in said blowing tube side and in said supplying tube side and a changing means cutting off and passing through said connecting tube.

3. The hydrogen generating apparatus of claim 2 wherein a combustion catalyst is mixed with a catalyst placed near said opening part of said supplying tube.

4. A hydrogen generating apparatus comprising:

a housing in which a catalyst is filled up in an inner space;

a supplying tube having an opening part opening to said inner space;

a blowing tube by which a reformed gas generated in said inner space is removed from said inner space, a methanol supplying means connected to said supplying tube, and an oxygen supplying means connected to said supplying tube, a heating means comprising a heater provided near said opening part of said supplying tube, and an enclosing material covering said housing and the heating means by which a space between said enclosing material and said housing is heated.

5. A hydrogen generating apparatus comprising:

a housing in which a catalyst is filled up in an inner space;

a supplying tube having opening parts opening to said inner space;

a blowing tube by which a reformed gas generated in said inner space with reacting is removed from said inner space;

a methanol supplying means connected to said supplying tube;

an oxygen supplying means connected to said supplying tube, and an opening part selecting means for directing oxygen and methanol through a selected opening part, wherein said supplying tube has at least opening parts having large and small areas.

6. A hydrogen generating apparatus comprising:

a plurality of housing in which a catalyst is filled up in an inner space in each housing;

a supplying tube opening to said inner space of each housing;

a blowing tube by which a reformed gas generated in said inner space of each housing is removed from said inner space;

a methanol supplying means connected to said supplying tube; and an oxygen supplying means connected to said supplying tube, wherein housing selective means are provided for selecting any of said housings with supplied methanol and oxygen.

7. A hydrogen generating apparatus of claim 1, wherein said supplying tube has plural opening parts.

8. A hydrogen generating apparatus of claim 1 characterized in that a stirring chamber is placed between said opening part, said methanol supplying means and oxygen supplying means.

9. A hydrogen generating apparatus comprising:

a housing in which a catalyst is filled up in an inner space;

a supplying tube having an opening part opening to said inner space, a blowing tube by which a reformed gas generated in said inner space is removed from said inner space;

a methanol supplying means connected to said supplying tube;

an oxygen supplying means connected to said supplying tube, an enclosing material covering said housing, and a heater by which a space between said enclosing material and said housing is heated.

10. The hydrogen generating apparatus of claim 9, wherein said heater is a burner.

* * * * *